United States Patent Office 2,967,894
Patented Jan. 10, 1961

2,967,894

METHOD FOR THE PREPARATION OF AROMATIC FLUOROCARBONS

Walter J. Pummer, Rockville, Md., Leo A. Wall, Washington, D.C., and Roland E. Florin, Takoma Park, Md., assignors to the United States of America as represented by the Secretary of the Army No Drawing. Filed Aug. 13, 1959, Ser. No. 833,651

13 Claims. (Cl. 260—650)

(Granted under Title 35, U.S. Code (1952), sec. 266)

The invention described herein may be manufactured and used by or for the Government for governmental purposes without the payment to us of any royalty thereon.

This invention relates to the synthesis of aromatic fluorocarbons. More specifically, it pertains to a method of producing aromatic fluorocarbons by a vapor phase hydrolysis of highly fluorinated aromatic compounds. The hydrolyzed compounds may be selectively reduced, iodinated and brominated.

The preparation of aromatic fluorocarbons by the prior methods has been extremely difficult. Some of the processes are complicated by the fact that they require many steps to produce the final product. It was not unusual for one to be required to perform ten steps or more in order to obtain an aromatic fluorocarbon of the type disclosed herein.

The preparation of aromatic fluorocarbons was attended by further difficulty in the selection of the proper catalyst. Many common procedures of hydrolysis, reduction and halogenation, when applied to haloaromatics encounter difficulty due to catalyst poisoning.

Furthermore, these processes with all their difficulties were, in addition, very time consuming and resulted in low yields of aromatic fluorocarbons.

An object of this invention is to produce valuable aromatic fluorocarbons in good yields by a simple and efficient method.

A further object of our invention is to produce aromatic fluorocarbons that may be selectively reduced and selectively halogenated without catalyst poisoning.

As a further object of our invention, we produce by a novel method useful aromatic fluorocarbons. These compounds are useful as dielectrics, fire retardant agents due to the presence of fluorine, lubricants and insulating material. The disubstituted compounds that have been reduced, brominated or iodinated, due to their remarkable stability, are also useful as intermediates in the preparation of other polymers such as perfluoropolyphenyl. Perfluoropolyphenyl is produced by a known process of heating di-iodo or dibromo tetrafluorobenzene at a temperature within the range of 200° to 250° C. in the presence of activated copper.

We have now found that we can produce disubstituted aromatic fluorocarbons by heating a highly fluorinated aromatic compound such as a fluorinated toluene which may or may not contain chlorine in the presence of a specific catalyst and steam at a high temperature to effect a vapor phase hydrolysis. Furthermore, by the proper selection of the catalyst and maintaining the proper conditions, the products obtained from the vapor phase hydrolysis may be selectively reduced, iodinated and brominated.

The foregoing and related objects are accomplished by a process, the essential feature of which is utilizing alumina and steam at high temperatures to effect hydrolysis of the starting product. The temperature during the reaction is maintained within a range of from about 300° to 400° C.

A specific reaction relating to perfluorotoluene or chloroheptafluorotoluene may be illustrated diagrammatically as follows wherein "X" equals fluorine or chlorine:

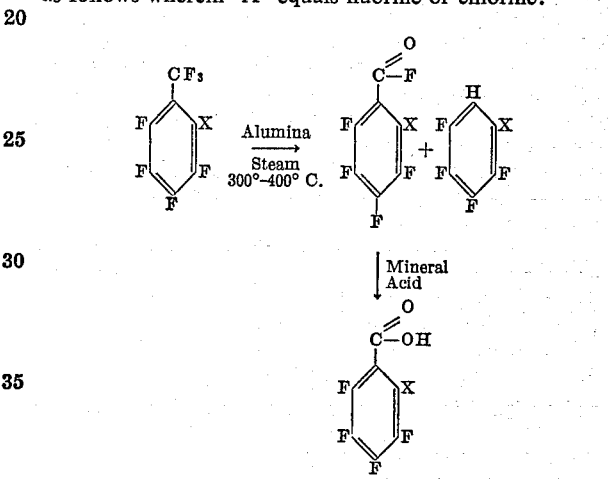

Any fluorinated toluene or chlorofluoro toluene may be used as the starting compound in the preparation of the disubstituted fluorobenzenes. Heptafluorotoluene and perfluorotoluene are the preferred embodiments. However, the toluene derivative may be fluorinated alone or fluorinated and chlorinated at any position. The reaction takes place at the hydrolyzable trifluoromethyl substituent.

In the search for improvement, this new method was developed which involves the vapor-phase hydrolysis of a fluorinated toluene or a chlorofluoro toluene by the use of alumina and steam at high temperatures. Maximum conversion was obtained at 330° C. Best results were obtained when pellet-size alumina (⅛ inch) was used or alumina of 8–14 mesh.

The results disclosed wherein chloroheptafluorotoluene is the starting material is illustrated below in Table I.

TABLE I.—HYDROLYSIS OF $C_6F_4ClCF_3$ (I) OVER ALUMINA

| Weight of Compound, g. | Catalyst Size Alumina, Mesh | Tube Material | $N_2$ Flow, cm.³/min. | Vaporizer Temp., °C. | Furnace Temp., °C. | Recovered $C_6F_4ClCF_3$, percent | Conversion | | Total Time, hr. |
|---|---|---|---|---|---|---|---|---|---|
| | | | | | | | $C_6F_4ClCOF$, percent | $C_6F ClH$, percent | |
| 200 | 80 to 200 a | Pyrex | d 125 | 110 | 324 | 81.0 | 63 | 0 | 13 |
| 100 | 80 to 200 a | do | e 125 | 108 | 335 | 33.1 | 33.1 | 13.8 | 5.5 |
| 966 | 80 to 200 a | Copper | f 125 | 110 | 330 | 49.4 | 17.4 | 34.8 | 33 |
| 549 | ⅛″ pellets b | do | f 200 | 120 | 330 | 48.9 | 67.1 | 24.7 | 12 |
| 1,000 | do | do | f 125 | 110 | 330 | 63.2 | 22.7 | 60.1 | 35 |
| 1,073 | 8 to 14 c | do | f 125 | 110 | 330 | 67.1 | 21.8 | 58.6 | 36 | a Merck chromatographic grade. Powder trail on the bottom of the tube.
b Harshaw Puralox. Completely filled.
c Fisher Scientific. Completely filled.
d Prepurified nitrogen with no moisture added.
e Water-pumped nitrogen containing traces of water.
f Prepurified nitrogen saturated with water.

The first example of Table I shows the results obtained at a lower temperature and in the absence of added moisture. However, there was sufficient water vapor remaining on the alumina to cause hydrolysis but not decarboxylation. Once the water was removed, the reaction stopped, as evidenced by the high recovery of 2-chloroheptafluorotoluene. With water-pumped nitrogen, i.e., by introducing traces of water, some decarboxylation occurred. The Pyrex glass furnace tube was eventually replaced by a copper tube because occasionally ring fluorine was removed by the reaction of the wet fluorocarbon was glass. This reaction was eliminated by the use of the copper tube.

Of special interest were the results obtained with the pellet-size alumina. At a slow input rate, a 60 percent conversion to 2,3,4,5-tetrafluorochlorobenzene was obtained. Then, by increasing the rate, i.e., increasing the nitrogen flow and raising the temperature of the vaporizer, it was possible to increase the relative yield of 2-chloro-3,4,5,6-tetrafluorobenzoyl fluoride. This was not surprising, however, since at the slow rate, 2-chloro-3,4,5,6-tetrafluorobenzoyl fluoride was in the furnace longer and hence it had more time to form a complex with the alumina, which in the presence of steam was decarboxylated. At the fast rate, then, the time in the furnace was decreased thereby reducing complex formation. The 8–14 mesh alumina had about the same activity as the pellets. The pellets were more effective than the powder-trail technique, mainly because the vapor had to pass through the reagent, resulting in better contact for reaction to occur.

An attempt was made to elucidate the mechanism by which 2,3,4,5-tetrafluorochlorobenzene was formed. This could occur either by direct removal of the trifluoromethyl as trifluoromethane or by the hydrolysis of this group, followed by decarboxylation. In one experiment, the effluent gases were collected in a liquid-nitrogen trap and analyzed in the mass spectrometer. The gas sample contained 99.6 percent of carbon dioxide, which confirms the hydrolytic mechanism.

Upon obtaining the hydrolyzed and decarboxylated products certain replacement reactions, decarboxylation, reduction, iodination and bromination reactions may be performed on these products if desired.

The hydrolyzed products obtained from the alumina method may be acidified with any mineral acid to obtain the organic acid. The acid salt may be decarboxylated by means of ethylene glycol. An 87% yield of the decarboxylated product is obtained by this method. The fluorocarbon hydride may be selectively iodinated in the presence of oleum.

The decarboxylated product may be selectively iodinated in oleum or it may be reduced in the presence of a palladium catalyst and the reduced product selectively iodinated or brominated in oleum.

In order to obtain the reduced product, it is necessary to remove the chlorine preferentially without the elimination of any fluorine. This problem was solved by passing the vaporized chloro compound together with hydrogen gas through a catalyst composed of 10% palladium mounted on activated one-eighth inch charcoal pellets or other inert material at 280° C. The chlorine was removed predominantly in 70 to 90% yields with less than 1% of the fluorine eliminated. This process is applicable for the preparation of any fluorine substituted benzene such as trifluorobenzene, tetrafluorobenzene and the like. This reduction reaction should find great use as a tool in synthesis in aromatic fluorocarbon chemistry.

The following examples illustrate a number of ways in which the principle of our invention may be applied, but are in no way to be construed as limiting the invention thereto.

ALUMINA METHOD—HYDROLYSIS OF THE TRIFLUOROMETHYL GROUP

A. Chloroheptafluorotoluene

The apparatus consisted of a 500-ml. round-bottom flask, which served as the vaporizer, with a side arm attached to a horizontally mounted copper tube furnace (30 in. long, 1⅛ in. diam.) by means of a 14/20-mm. ball-and-socket joint. The outlet of the furnace was connected to a 500-ml. round-bottom receiver containing a stopcock at the bottom for drainage. The vaporizer was fitted with a 24/40-mm. throughjoint and the lower portion extended almost to the bottom of the flask. The upper end of this joint was Y-shaped. One side was used for filling the vaporizer, while the other side was connected to a gas dispersion trap containing 400 ml. of water from which the nitrogen acquired its moisture.

In a typical run, when the furnace containing alumina had reached the desired temperature (330° C.), 1 kg. of 2-chloroheptafluorotoluene was placed in the vaporizer maintained at 120° C. It was carried into the furnace containing alumina by the aid of the wet nitrogen. The rate was controlled by the nitrogen flow and the temperature of the vaporizer bath. The products (899 g.) were collected in the receiver maintained at room temperature. They were shaken with three 200-ml. portions of 10 percent potassium hydroxide to remove the 2-chloro-3,4,5,6-tetrafluorobenzoyl fluoride as the potassium salt of the acid. Acidification of the combined basic solutions afforded 85 g. (22.7% conversion, based on recovered chloroheptafluorotoluene) of 2-chloro-3,4,5,6-tetrafluorobenzoic acid, M.P. 88° to 90° C. The base insoluble liquid was washed with 500 ml. of water, dried ($Na_2SO_4$), and distilled. There was obtained 161 g. (60% based on chloroheptafluorotoluene of 2,3,4,5-tetrafluorochlorobenzene, boiling point 121.5° to 123° C.; $n_D^{20}=1.4391$; $D_{24}^{24}=1.534$.

Analysis.—Calculated for $C_6HClF_4$: H, 0.54; Cl, 19.21. Found: H, 0.50; Cl, 18.90. The recovered 2-chloroheptafluorotoluene, 632 g., was then recycled.

The crude acid fluoride (boiling point 161° to 164° C.) reacted readily with cold concentrated ammonium hydroxide to form the 2-chloro-3,4,5,6-tetrafluorobenzamide, M.P. 101° to 103° C. after two recrystallizations from 50 percent ethanol.

Analysis.—Calculated for $C_7H_2ClF_4NO$: C, 36.9; Cl, 15.6; F, 33.4; N, 6.15. Found: C, 36.9; Cl, 15.7; F, 34.0; N, 6.1.

B. Perfluorotoluene

The same apparatus used with chloroheptafluorotoluene was used with perfluorotoluene.

100 g. of perfluorotoluene was placed in the vaporizer maintained at about 105° C. It was carried into the furnace by the aid of wet nitrogen. The furnace temperature was about 320° C. The products, pentafluorobenzoyl fluoride and pentafluorobenzene were collected in the receiver and separated by the same means employed in the above example.

Silver-2-chloro-3,4,5,6-tetrafluorobenzoate

Fifty grams (0.22 mole) of the acid 2-chloro-3,4,5,6-tetrafluorobenzoic acid was dissolved in excess dilute $NH_4OH$. When the excess ammonia was removed by boiling, a solution of 50 g. (0.30 mole) of silver nitrate in 75 ml. of water was added with stirring. The mixture was cooled, and the silver salt was collected by filtration. After washing with 60 ml. of cold distilled water, 50 ml. of cold methanol, and 100 ml. of petroleum ether, the salt was dried in an oven at 110° C. for 72 hr. and then for 24 hr. more over Drierite. The dried compound silver-2-chloro-3,4,5,6-tetrafluorobenzoate weighed 60.5 g.; 82-percent yield.

2-chloro-3,4,5,6-tetrafluoroiodobenzene a. DIRECT METHOD

Into a 250-ml. round-bottom flask was placed an intimate mixture of 30 g. (0.09 mole) of silver-2-chloro-3,4,5,6-tetrafluorobenzoate and 90 g. (0.35 mole) of iodine. The flask was fitted with a reflux condenser which was attached to a solid carbon dioxide trap leading to a mineral-oil bubbler. The reaction was initiated by gently heating the upper edges of a Bunsen burner. The heating was gradually applied around the flask and continued until the reaction ceased. The flask was cooled, and the contents extracted several times with ether. The combined ether solutions were successively washed with 50-ml. portions of 10 percent sodium bisulfite, 10 percent sodium carbonate, water, 10 percent hydrochloric acid, water, and finally dried over anhydrous calcium chloride. After removal of the solvent and distillation of the residue, there was obtained 4.5 g. (16.2% yield) of 2-chloro-3,4,5,6-tetrafluoroiodobenzene, boiling point 71° to 72° C./6 mm.; $n_D^{20}$=1.5349.

Analysis.—Calculated for $C_6F_4ClI$: C, 23.21; F, 24.50; I, 40.83. Found: C, 23.20; F, 24.50; I, 41.95. There was obtained also 2 g. of a high-boiling residue (150° to 200° C./1 mm.) which has not been identified, but may possibly be a coupling product.

b. INDIRECT METHOD

First step—2,3,4,5 - tetrafluorochlorobenzene.—Thirty grams (0.09 mole) of silver-2-chloro-3,4,5,6-tetrafluorobenzoate and 15 g. of ethylene glycol were placed into a 250-ml. flask, fitted with a reflux condenser leading to a solid carbon dioxide trap. The flask was inserted gradually into a Wood's-metal bath at 160° C. Marked refluxing of the product was evident after about 10 min., and the reaction appeared to be complete after 20 min. However, to insure completion, the temperature was slowly raised to 170° C. for 1 hr. more. The mixture was cooled to below 100° C. and the apparatus rearranged for distillation. The 2,3,4,5-tetrafluorochlorobenzene distilled at 122° to 123° C., weight 14.3 g. (86.5% yield); $D_{24}^{24}$=1.536; $n_D^{20}$=1.4396.

Second step.—Into a 100-ml. three-necked flask, fitted with a stirrer, dropping funnel, and reflux condenser, were placed 13 g. (0.05 mole) of iodine and 15 ml. of 65 percent fuming sulfuric acid. To the stirred reaction mixture was added 6 g. (0.0325 mole) of 2,3,4,5-tetrafluorochlorobenzene dropwise over a ½-hr. period. When the addition was completed, the stirred mixture was heated at 60° C. in a water bath for 2 hr. The reaction mixture was cooled, poured onto 50 g. of ice, and decolorized by the addition of 100 ml. of 10 percent aqueous sodium bisulfite. An ether extraction, followed by drying ($Na_2SO_4$) and distillation, afforded 6.83 g. (66.9% yield) of 2-chloro-3,4,5,6-tetrafluoroiodobenzene, boiling point 70° to 72° C./5 mm.

1,2,3,4-tetrafluorobenzene

For the reduction of 2,3,4,5-tetrafluorochlorobenzene the same apparatus was used as described above for the alumina method of hydrolysis, except that the furnace tube was made of 20 mm. Pyrex tubing and only a 5-in. section contained the catalyst. The gas dispersion trap contained concentrated sulfuric acid, instead of water, for drying the hydrogen. Twenty grams of the moist catalyst (10% palladium on ⅛ in. activated charcoal pellets (Columbian grade, 4 to 6 mesh, CXAL, activated carbon, Carbide and Carbon Company)), were placed in the furnace and preheated at 280° C. for 2 hr. in the hydrogen atmosphere. When the water was removed, 123 g. (0.66 mole) of 2,3,4,5-tetrafluorochlorobenzene was placed in the vaporizer maintained at 110° C. The hydrogen flow rate was adjusted to 100 cm.³/min., and 4 hr. were required to complete the run. The products (97 g.) were washed with three 100 ml. portions of water, dried ($Na_2SO_4$), and distilled. There was obtained 77.2 g. (77% yield) of 1,2,3,4-tetrafluorobenzene; boiling point 94.8–95° C.; $n_D^{20.2}$=1.4095; $D_{23.5}^{23.5}$=1.401. No impurities were observed from the mass spectrometer analysis.

Analysis.—Calculated for $C_6H_2F_4$: C, 48.0; H, 1.3. Found: C, 48.4; H, 1.4.

There was also obtained a small forerun, 3 g., boiling point 88° to 90° C.; from the mass spectrometer analysis it was found to be a mixture of 60 percent tetrafluorobenzene (presumably the 1,2,4,5-isomer) and 40 percent trifluorobenzene of unknown structure. These products were not further investigated.

1,2-diiodo-3,4,5,6-tetrafluorobenzene 454 g. (1.79 moles) of iodine and 1.3 kg. of 65% fuming sulfuric acid were mixed and stirred at room temperature for 30 minutes. Then 250 g. (1.66 moles) of tetrafluorobenzene was added gradually over a period of 10 minutes. Subsequently, the mixture was heated on a water bath at 55° to 60° C. for 3 hours. The mixture was cooled and poured over crushed ice. A solid formed which was filtered, washed with aqueous sodium bisulfite and dried. This material was recrystallized from a methanol-water mixture, giving 455 g. of 1,2-diiodo-3,4,5,6-tetrafluorobenzene, yield 67%; M.P. 50.5° C. to 51.8° C. (white plates).

Analysis.—Calculated for $C_6F_4I_2$: I, 63.1. Found: I, 62.3.

1,2-dibromo-3,4,5,6-tetrafluorobenzene

To 200 ml. of 65% oleum in a three-necked flask, was added 114 g. of bromine with stirring and external cooling in an ice-water bath. The contents were stirred for one hour more, at which time, 100 g. (0.73 mole) of 1,2,3,4-tetrafluorobenzene was added over a two hour period. The reaction was exothermic and again external cooling was necessary. It was allowed to come to room temperature over a four hour period with stirring. The contents were then cooled to −20° C. by means of an acetone-Dry Ice mixture and cautiously 500 ml. of ice water was added. The bottom organic layer was separated and washed with 10% aqueous sodium bisulfite, 5% sodium hydroxide solution and finally with water. The colorless liquid was dried and distilled. There was obtained 120 g. (58.9%) of 1,2-dibromo-3,4,5,6-tetrafluorobenzene, B.P. 96–97/20 mm., $n_D^{21}$=1.5180. A higher boiling fraction (106–107°/1 mm.) was also obtained, but its structure is still unknown.

As many apparently widely different embodiments of the invention, will from the foregoing, be immediately obvious to one skilled in the art, it is to be understood that we do not limit ourselves to specific embodiments thereof except as defined in the appended claims.

We claim:

1. A method which comprises the vapor phase hydrolysis of a substituted toluene selected from the group consisting of fluorinated toluenes and chlorofluoro toluenes containing a trifluoromethyl group with steam in the presence of an alumina catalyst and recovering the hydrolyzed and decarboxylated compounds.

2. The method according to claim 1, wherein the substituted toluene is chloroheptafluorotoluene.

3. The method according to claim 1, wherein the substituted toluene is perfluorotoluene.

4. The method according to claim 2, wherein the reaction temperature is about 330° C.

5. A method for the preparation of a fluorine substituted benzene which comprises a vapor phase hydrolysis of a substituted toluene selected from the group consisting of fluorinated toluenes and chlorofluoro toluenes containing a trifluoromethyl group with steam in the presence of an alumina catalyst and reducing the decarboxylated compound in the presence of a palladium catalyst.

6. The method according to claim 5, wherein the fluorinated toluene is perfluorotoluene.

7. The method according to claim 5, wherein the chlorofluoro toluene is chloroheptafluorotoluene.

8. The method according to claim 5, wherein the temperature during reduction is about 280° C.

9. The method according to claim 5, wherein the fluorine substituted benzene is brominated in oleum.

10. The method according to claim 5, wherein the fluorine substituted benzene is iodinated in oleum.

11. A method for producing tetrafluorochlorobenzene which comprises a vapor phase hydrolysis of chloroheptafluorotoluene with steam in the presence of an alumina catalyst to produce tetrafluorobenzoic acid, forming a metallic salt of said acid and decarboxylating said salt with ethylene glycol.

12. The method according to claim 11, with the additional step of reducing tetrafluorochlorobenzene in the presence of a palladium catalyst.

13. The method according to claim 11, wherein tetrafluorochlorobenzene is iodinated in oleum.

References Cited in the file of this patent

Wagner et al.: "Synthetic Organic Chemistry," John Wiley & Sons, New York, N.Y., pages 8, 13–14, 98–99 and 418.